(12) United States Patent
Dvir et al.

(10) Patent No.: US 12,725,400 B2
(45) Date of Patent: Sep. 1, 2026

(54) METHOD AND SYSTEM FOR TRAINING A MACHINE LEARNING MODEL WITH A SUBCLASS OF ONE OR MORE PREDEFINED CLASSES OF VISUAL OBJECTS

(71) Applicant: BRIEFCAM LTD., Modi'in (IL)

(72) Inventors: Igal Dvir, Modi'in (IL); Hagy Ketashvily, Modi'in (IL); Shimrit Haber, Modi'in (IL); Bnaya Ori, Modi'in (IL); Shmuel Peleg, Modi'in (IL)

(73) Assignee: BRIEFCAM LTD., Modi'in (IL)

( * ) Notice: Subject to any disclaimer, the term of this patent is extended or adjusted under 35 U.S.C. 154(b) by 0 days.

(21) Appl. No.: 18/366,750

(22) Filed: Aug. 8, 2023

(65) Prior Publication Data

US 2024/0233327 A1 Jul. 11, 2024

Related U.S. Application Data

(60) Provisional application No. 63/478,521, filed on Jan. 5, 2023.

(51) Int. Cl.
*G06V 10/764* (2022.01)
*G06V 10/778* (2022.01)

(52) U.S. Cl.
CPC ........ *G06V 10/764* (2022.01); *G06V 10/7788* (2022.01)

(58) Field of Classification Search
None
See application file for complete search history.

(56) References Cited

U.S. PATENT DOCUMENTS

| | | | | |
|---|---|---|---|---|
| 10,614,207 | B1 * | 4/2020 | Truong | G06V 10/7788 |
| 10,958,854 | B2 * | 3/2021 | Elboher | G06V 20/54 |
| 11,205,103 | B2 * | 12/2021 | Zhang | G06N 20/10 |
| 11,527,265 | B2 * | 12/2022 | Peleg | G06V 10/764 |
| 12,354,306 | B2 * | 7/2025 | Adeel | G06V 10/764 |

(Continued)

OTHER PUBLICATIONS

"What is Supervised Learning", IBM, Available online: https://www.ibm.com/topics/supervised-learning, Accessed online on Aug. 28, 2024. (Year: 2024).*

*Primary Examiner* — Tahmina N Ansari
(74) *Attorney, Agent, or Firm* — PEARL COHEN ZEDEK LATZER BARATZ LLP

(57) ABSTRACT

A system and a method for training a machine learning model with a subclass of one or more predefined classes of visual objects obtained from a video, are provided herein. The method includes: presenting to a human operator, over an electronic display, a plurality of visual objects obtained from the video, wherein the plurality of visual objects belongs to one or more predefined classes of visual objects; receiving from the human operator, a selection of some of the plurality of visual objects, wherein the selection is directed at visual objects belonging to at least one subclass of the one or more predefined classes; and training a machine learning model, using a computer processor, to distinguish between visual objects belonging to the at least one subclass and visual objects belonging to the predefined one or more classes but not belonging to the at least one subclass, based on said selection.

18 Claims, 2 Drawing Sheets

(56) References Cited

U.S. PATENT DOCUMENTS

| | | | | |
|---|---|---|---|---|
| 2007/0276776 | A1* | 11/2007 | Sagher | G06F 18/41 706/25 |
| 2014/0040173 | A1 | 2/2014 | Sagher et al. | |
| 2018/0165554 | A1* | 6/2018 | Zhang | G06F 18/214 |
| 2018/0204360 | A1* | 7/2018 | Bekas | G06V 30/19173 |
| 2020/0036909 | A1* | 1/2020 | Caspi | H04N 5/272 |
| 2021/0264226 | A1* | 8/2021 | Lecue | G06N 5/022 |
| 2024/0046515 | A1* | 2/2024 | Adeel | G06V 10/82 |
| 2025/0308067 | A1* | 10/2025 | Adeel | G06T 7/75 |

* cited by examiner

METHOD AND SYSTEM FOR TRAINING A MACHINE LEARNING MODEL WITH A SUBCLASS OF ONE OR MORE PREDEFINED CLASSES OF VISUAL OBJECTS

CROSS REFERENCE TO RELATED APPLICATIONS

This application claims the benefit of U.S. Provisional Patent Application No. 63/478,521, filed on Jan. 5, 2023 which is hereby incorporated by reference in its entirety.

FIELD OF THE INVENTION

The present invention relates generally to the field of video processing and, more particularly, to automatic object-aware video and audio processing.

BACKGROUND OF THE INVENTION

Video cameras are widely used today for various use cases Including personal use (all smartphones have a video camera), security and surveillance and even driving assistance. In many cases the video is recorded continuously. In case of security/surveillance cameras, it's recorded on VMS (Video Management Software) systems. The recorded video is unstructured by nature. It can only be tagged and searched by time and location (GPS or known location of fixed camera).

To enable more efficient ways to search in video, as well as generate insights for real-time alerts or business intelligence based on understanding trends, algorithms have been developed to detect static and moving objects, track them, classify them into object types (such as people, vehicles, etc.) and implement various business logics for investigation, real-time alerts and other use cases. Modern algorithms typically use deep neural networks that are trained to detect and classify objects based on examples annotated by people. Other scene understanding, object detection, tracking, and classification methods exist that are also trained on annotated training data.

For the development of a commercial product, the typical development process includes the collection of many hours of video, annotation of this video by manual selection and cropping of the relevant object types (for example people wearing a hat). The video with annotations is then used to select and train a neural network to detect this specific object type. After the neural network is trained and has satisfactory results (accuracy), also on test data not used for training, it is then implemented into the customer's product. This process has two main challenges when the desired objects are not general, but are specific to some customers: First, it requires that customers send some of their video data outside their organization to the video analysis company. This is challenging due to privacy, security, and regulations, and second, the overall process can take a long time as it involves multiple organizations. It can also take longer time due to several iterations.

In order to overcome the aforementioned challenges, several attempts were made to pack the aforementioned processes into one application, enabling it to be done by the end user, in the own environment of the end user and network and by the same application that the end user is using for operational work with video.

For example, US Patent Application Publication No. US 2007/0276776 describes the benefits in having the end-user train specialized classes. It describes a software application that allows a user to define a new class.

In another example, US Patent Application Publication No. US 2014/0040173 describes a method enabling users to enhance detection performance of an existing class when further trained on the data of the user.

SUMMARY OF THE INVENTION

By taking a different approach compared with the prior art, the inventors of the present invention suggest introducing a new class which is a subclass of a prior existing class and train a machine learning model bases on the subclasses of the existing class.

According to some embodiments of the present invention, a system and a method for training a machine learning model with a subclass of one or more predefined classes of visual objects obtained from one or more videos, are provided herein. The method may include the following steps: presenting to a human operator, over an electronic display, a plurality of visual objects obtained from the one or more videos, wherein the plurality of visual objects belongs to a predefined class of visual object: receiving from the human operator, over a user interface associated with the electronic display, a selection of some of the plurality of visual objects, wherein the selection is directed at visual objects belonging to at least one subclass of the one or more predefined classes: and training a machine learning model, using a computer processor, to distinguish between visual objects belonging to the at least one subclass and visual objects belonging to the one or more predefined classes but not belonging to the at least one subclass, based on said selection.

BRIEF DESCRIPTION OF THE DRAWINGS

The subject matter which is regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
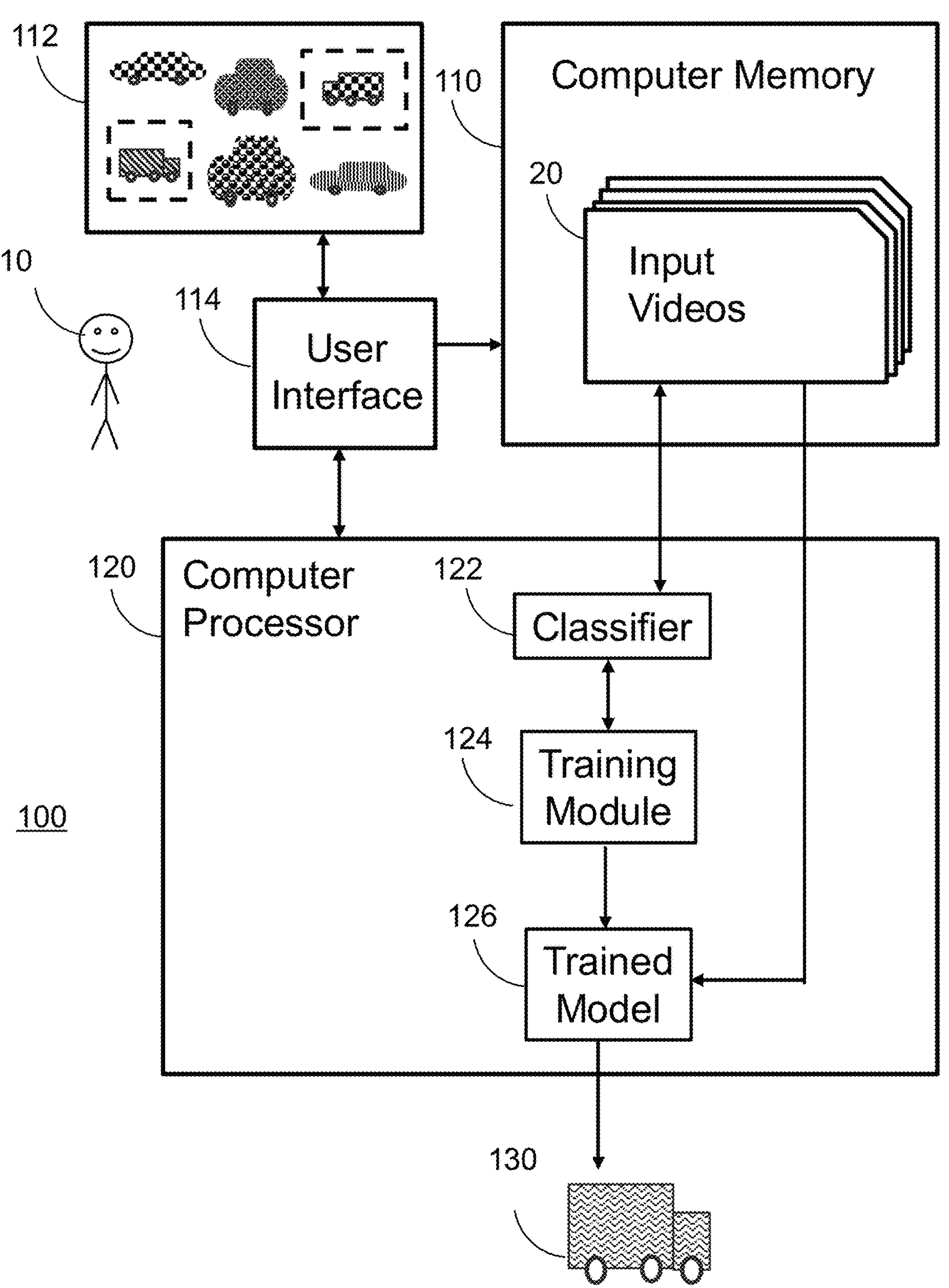
FIG. 1 is a block diagram illustrating non-limiting exemplary architecture of a system accordance with embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The aforementioned prior art technology requires repetition of the processes for each object thus dictating a high workload on the end user. Even refining or enhancing pre-defined classes as suggested by the prior art may lead to excessive workload as it requires repeating many steps for most objects.

In contrast, embodiments of the present invention suggest defining subclasses and then carrying out the necessary steps for training the models only for objects belonging to the defined sub classes. Advantageously, embodiments of the present invention significantly reduce the complexity and the processing power required to train the model with regard to visual object classes.

Specifically, embodiments of the present invention may include the following components: a system having pre-trained classifiers to detect and classify predefined object types (such as a person, a 4-wheel vehicle, an animal, a 2-wheel vehicle, etc.). There are various solutions in the market that enable this capability. Such a system, for example, enables the user to find instances of selected object types, in selected cameras, over a selected time frame in the recorded video. A detected object will usually be marked by a bounding box around the location of the detected object in the video frame, or alternatively by a mask specifying the pixels belonging to the detected object. The system would normally display at least one thumbnail image for each detected object in the scene. This thumbnail image will include a bounding box that includes the detected object.

FIG. 1 is a block diagram illustrating non-limiting exemplary architecture of a system 100 for training a machine learning model with a subclass of one or more predefined classes of visual objects obtained from one or more videos, accordance with embodiments of the present invention.

System 100 may include: a computer memory 110 configured to store one or more input videos 20 comprising visual objects. System 100 may further include a pretrained classifier 122 implemented by a computer processor 120 configured to classify the visual objects from the input videos 20 into a plurality of predefined classes. System 100 may further include an electronic display 112 configured to present to a human operator 10, a plurality of visual objects obtained from the one or more videos, belonging to one of the one or more predefined classes requested by the human operator (for example—vehicles. System 100 may further include a user interface 114 associated with electronic display 112, configured to receive from human operator 10, a selection of some of the plurality of visual objects (indicated by dashed lines), wherein the selection is directed at visual objects belonging to at least one subclass of the one or more predefined classes requested by the human operator (for example trucks being a subclass of vehicles).

System 100 may further include a machine learning module 124, implemented by computer processor 120, configured to train a trained model 126 to distinguish between visual objects belonging to the at least one subclass and visual objects belonging to the one or more predefined classes but not belonging to the at least one subclass, based on the selection of some of the plurality of visual objects by the human operator as belonging to the at least one subclass and further based on some of said plurality of visual objects not selected by the human user as belonging to the at least one subclass.

In accordance with some embodiments of the present invention, computer processor 120 may be further configured to determine, based on the trained model, whether or not a newly obtained visual object 130 belongs to the at least one subclass (for example a newly obtained truck not appearing on electronic display 112).

In accordance with some embodiments of the present invention the at least one subclass comprises at least a first subclass and a second sub class wherein the selection and the training is carried out for the first subclass and then repeated with the second subclass.

In accordance with some embodiments of the present invention the at least one subclass comprises at least a first subclass and a second sub class wherein the selection is carried out for the first and the second subclasses and then the training is carried out for the first and the second subclasses simultaneously.

In accordance with some embodiments of the present invention, a tracking algorithm that can track multiple instances of a detected (or selected) object as they appear in a video clip across multiple video frames. Once an object has been detected in one video frame, the tracking algorithm will place bounding boxes around all appearances of that object in other frames of same video clip.

A Selection tool that displays to the user thumbnails showing images of the detected objects and enables the user to select a subset of images from the presented thumbnails. For example, in a case that the selected pretrained object class was "person" and the selected subset includes people wearing a safety vest. The selected thumbnails will be defined as images of "positive examples" for the subclass of "people wearing safety vests". The non-selected thumbnails will be defined as "negative examples" for that subclass. It should be noted that once the user selects a specific thumbnail image, the system can create additional positive examples of this specific object based on the tracking of this object across the video frames as described above. Also, for a non-selected object, the system can create additional negative examples of this specific object based on the tracking of this object across the video frames as described above.

In accordance with some embodiments of the present invention, machine learning module 124 may employ at least one pre-defined neural network model, to be trained to recognize the sub-class defined by the selected objects. There are several possibilities for using such models. For example, one option for such a model is a fully pretrained model on a large object recognition dataset. In this case only some of the layers of the model will be trained. Another example is a non-trained model, that will be trained from the beginning. It is possible that a few different neural network models will be trained in parallel, and the model that can be trained for best results will eventually be used.

In accordance with some embodiments of the present invention, a neural network training framework using supervised learning may be used by machine learning module 124 to train a given neural network model to classify a desired sub-class.

The process below enables an end user to build a new sub-class filter for a specific object type that is relevant for the user using only a few simple steps.

The user wants to define a new classifier that will detect and classify a "New Sub-Class" whose objects are sub-classes of previously defined classes (for example "a person wearing a uniform" is a sub-class of the "person" class, or a "taxi" is a subclass of a "car" class). For this purpose, the user can select one or more predefined classes (for example, "Person" when the desired subclass is a "person wearing a uniform", or "car" when the desired sub-class is a "taxi"). This selection will give, and display, images of objects in the class, normally including images of the desired "New Sub-Class" as well as images of other objects in the class. "New Sub-Class" objects are therefore a subgroup of the objects of the selected class. The objects in the selected class can also be limited by other selection criteria such as by the cameras they came from, by the time of video capture, by area in the image they are at in, by their activity type, or any other selection criteria available in the system. Once the images of the objects in the selected class are displayed. the user can tag the images that correspond to the "New Sub-Class" objects. After selecting the tagged "New sub-Class" objects, the user will activate a training process, for example by clicking a "Training" button. This will start an automatic process that will do the following:

- Select images of the objects tagged as belonging to "New Sub-Class", including their corresponding instances in other frames as obtained by tracking. These selected images will be referred to as "positive examples" of the "New Sub-Class".
- Select non-tagged objects, including their corresponding instances in other frames obtained by tracking. These selected images will be referred to as "negative examples" of the "New Sub-Class".
- Train at least one Neural Network model to distinguish between "New Sub-Class" objects and the other objects by using the positive and negative examples. This can be done in various ways. As an example, A neural network can be trained from scratch. As another example, a pretrained Neural network can be used, where only some of the layers of the pre-trained neural network (typically the last layers) will be trained to distinguish between "New Sub-Class" objects vs. the other objects. In the case that multiple models will be trained, the model with best performance can be selected by the user or can be automatically selected by the system. Performance of the trained network can be determined as common in the art, for example by splitting the tagged data into a training set and a test set.

The newly trained neural network selected in the previous step will be added to the pipeline of object classification, and this "New Sub-Class" will be added as a subclass of the original class from which it was derived. For example, "people with uniforms", will be added under the class of "Person". It can optionally be given a new name such as "soldier".

The end user will now be able to select and filter all objects classified as "New Sub-class", as well as objects that are within the class but are not "New Sub-Class".

Any system operation that can be done on object classes, such as detection, display, or defining different rules for alerts, can now use the "New Sub-Class".

Figure 2:
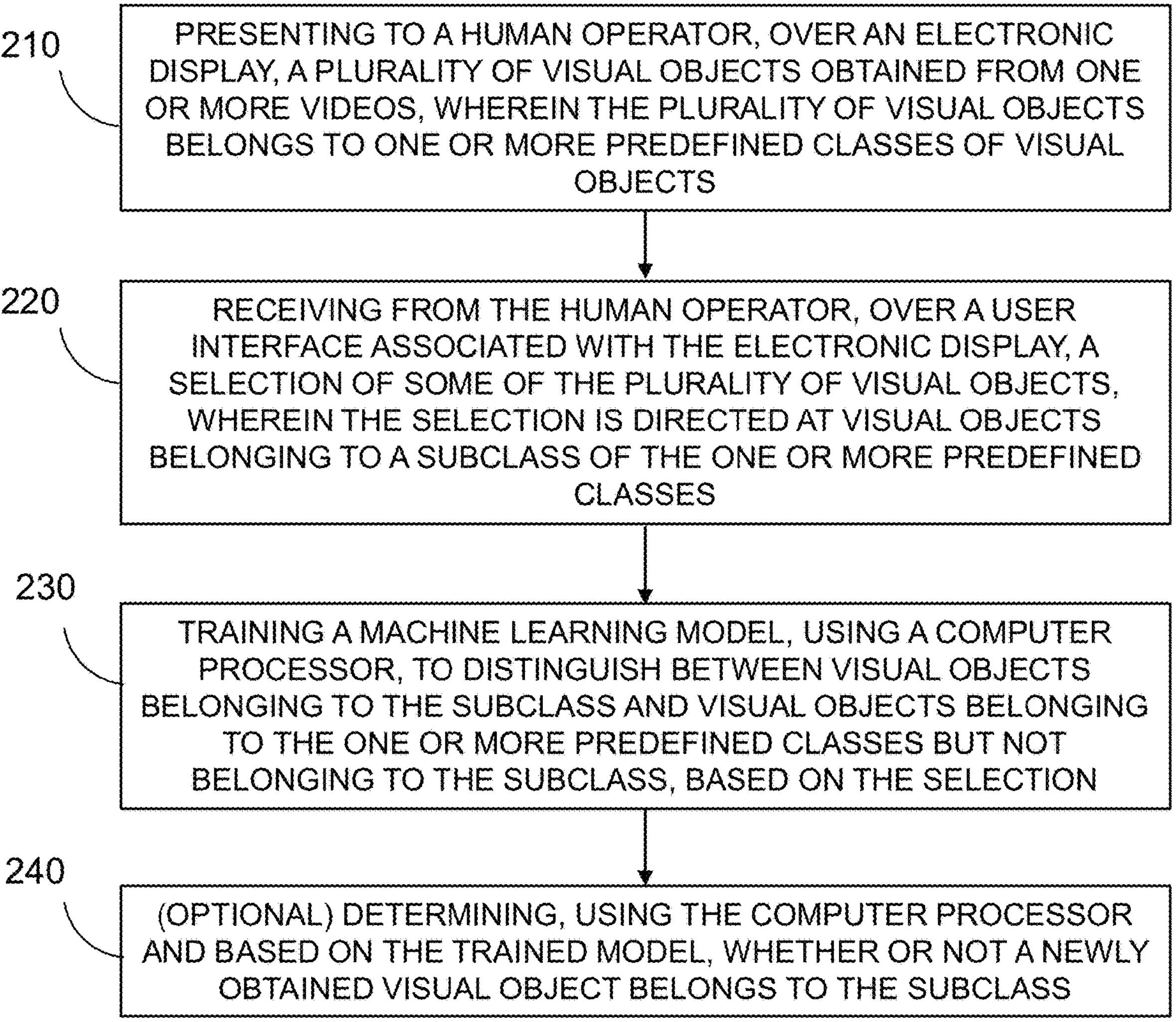
FIG. 2 is a high-level flowchart illustrating a non-limiting exemplary method in accordance with some embodiments of the present invention.

FIG. 2 is a high-level flowchart illustrating a non-limiting exemplary method of training a machine learning model with a subclass of one or more predefined classes of visual objects obtained from one or more videos in accordance with some embodiments of the present invention. Method 200 may include the following steps: presenting to a human operator, over an electronic display, a plurality of visual objects obtained from the one or more videos, wherein the plurality of visual objects belongs to one or more predefined classes of visual object 210: receiving from the human operator, over a user interface associated with the electronic display, a selection of some of the plurality of visual objects, wherein the selection is directed at visual objects belonging to at least one subclass of the one or more of the predefined classes 220: and training a machine learning model, using a computer processor, to distinguish between visual objects belonging to the at least one subclass and visual objects belonging to the one or more predefined classes but not belonging to the at least one subclass, based on the selection of some of the plurality of visual objects by the human operator as belonging to the at least one subclass and further based on some of said plurality of visual objects not selected by the human user as belonging to the at least one subclass 230.

According to some embodiments of the present invention, method 200 may further include a step of determining, using the computer processor and based on the trained model, whether or not a newly obtained visual object belongs to the at least one subclass 240.

According to some embodiments of the present invention, in method 200, the at least one subclass comprises at least a first subclass and a second sub class wherein the selection and the training is carried out for the first subclass and then repeated with the second subclass.

According to some embodiments of the present invention, in method 200, the at least one subclass comprises at least a first subclass and a second sub class wherein the selection is carried out for the first and the second subclasses and then the training is carried out for the first and the second subclasses simultaneously.

According to some embodiments of the present invention, in method 200, the one or more predefined classes may optionally be selected by the computer processor. In some embodiment a computer implemented process that checks the objects in some of the predefined classes, given the input videos, and when the objects selected for one or more predefined classes have variance above a predefined threshold, the system can automatically suggest to the human operator to define some sub-classes, and thereafter method 200 continues as explained above.

According to some embodiments of the present invention method 200 may include automatically suggesting to the human operator which class of the one or more predefined classes of the visual objects may best benefit from having subclasses, for example a class with a high variance of visual features.

Some embodiments of the invention may be carried out by a computing system. For example, a processor, operatively connected to a memory holding data and software, code, or instructions, may be configured or programmed by the software, code or instructions to carry out embodiments of the present invention. More than one such processor or computing system may be used.

It should be noted that all methods according to some embodiments of the present invention may be stored as instructions in a computer readable medium to cause processors, such as central processing units (CPU) to perform the method. Additionally, the method described in the present disclosure can be stored as instructions in a non-transitory computer readable medium, such as storage devices which may include hard disk drives, solid state drives, flash memories, and the like. Additionally, non-transitory computer readable medium can be memory units.

In order to implement the method according to some embodiments of the present invention, a computer processor may receive instructions and data from a read-only memory or a random-access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, JavaScript Object Notation (JSON), C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some aspects of the present invention are described above with reference to flowchart illustrations and/or portion diagrams of methods, apparatus (systems) and computer program products according to some embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that, where the claims or specification refer to "a" or "an" element, such reference is not be construed that there is only one of that element.

It is to be understood that, where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of training a machine learning model with a subclass of one or more predefined classes of visual objects obtained from one or more videos, the method comprising:

presenting to a human operator, over an electronic display, a plurality of presented visual objects obtained from the one or more videos, wherein the plurality of presented visual objects belongs to one predefined class of visual objects;

receiving from the human operator, over a user interface associated with the electronic display, selected visual objects being a selection of some of the plurality of the presented visual objects, wherein the selection is directed at visual objects belonging to at least one subclass of the one predefined class;

creating, by a computer processor, additional samples of the selected visual objects belonging to at least one subclass of the one predefined class, by tracking the selected visual objects across video frames of the one or more videos and extracting corresponding tracked thumbnail images of the selected visual objects from different frames;

carrying out supervised training of a classifier, using the computer processor, the selected visual objects and the additional samples of the selected visual objects, together with non-selected visual objects from the plurality of presented visual objects as negative examples, to distinguish between the selected visual objects and the presented visual objects which were not selected; and applying the classifier as a subclass filter in an object-classification pipeline for classifying visual objects in other videos, as belonging to the selected at least one subclass.

2. The method according to claim 1, further comprising: determining, using the computer processor and based on the trained model, whether or not a newly obtained visual object belongs to the at least one subclass.

3. The method according to claim 1, wherein the at least one subclass comprises at least a first subclass and a second sub class wherein the selection and the training is carried out for the first subclass and then repeated with the second subclass.

4. The method according to claim 1, wherein the at least one subclass comprises at least a first subclass and a second sub class wherein the selection is carried out for the first and the second subclasses and then the training is carried out for the first and the second subclasses simultaneously.

5. The method according to claim 1, wherein the one or more predefined classes of the visual objects comprises a single predefined class of the visual objects.

6. The method according to claim 1, further comprising automatically suggesting to the human operator which class of the one or more predefined classes of the visual objects may best benefit from having subclasses.

7. A system for training a machine learning model with a subclass of one or more predefined classes of visual objects obtained from one or more videos, the system comprising:

a computer memory configured to store one or more input videos comprising visual objects;

a classifier implemented by a computer processor configured to classify the visual objects from the input videos into a plurality of predefined classes;

an electronic display configured to present to a human operator, a plurality of presented visual objects obtained from the one or more videos, belonging to one of the one predefined class requested by the human operator;

a user interface associated with the electronic display, configured to receive from the human operator, selected visual objects being a selection of some of the plurality of the presented visual objects, wherein the selection is directed at visual objects belonging to at least one subclass of the one predefined class and a machine learning module, implemented by the computer processor, configured to create additional samples of the selected visual objects by tracking said selected visual objects across video frames of the one or more videos and to carry out supervised training of a classifier, using the selected visual objects, the additional samples of the selected visual objects, and non-selected visual objects as negative examples, to distinguish between the selected visual objects and the presented visual objects which were not selected, wherein the computer processor applies the classifier as a subclass filter for classifying visual objects in other videos, as belonging to the selected at least one subclass.

8. The system according to claim 7, wherein the computer processor is further configured to determine, based on the trained model, whether or not a newly obtained visual object belongs to the at least one subclass.

9. The system according to claim 7, wherein the at least one subclass comprises at least a first subclass and a second sub class wherein the selection and the training is carried out for the first subclass and then repeated with the second subclass.

10. The system according to claim 7, wherein the at least one subclass comprises at least a first subclass and a second sub class wherein the selection is carried out for the first and the second subclasses and then the training is carried out for the first and the second subclasses simultaneously.

11. The system according to claim 7, wherein the one or more predefined classes of the visual objects comprises a single predefined class of the visual objects.

12. The system according to claim 7, wherein the computer processor is further configured to automatically suggest to the human operator which class of the one or more predefined classes of the visual objects may best benefit from having subclasses.

13. A non-transitory computer readable medium for training a machine learning model with a subclass of one or more predefined classes of visual objects obtained from one or more videos, the computer readable medium comprising a set of instructions that, when executed, cause at least one computer processor to:

classify the visual objects from the one or more videos into a plurality of predefined classes;

present to a human operator, over an electronic display, a plurality of presented visual objects obtained from the one or more videos, belonging to the one predefined class requested by the human operator;

receive from the human operator, over a user interface associated with the electronic display, a selection of some of the plurality of visual objects, wherein the selection is directed at visual objects belonging to at least one subclass of the one predefined class;

create additional samples of the selected visual objects by tracking said selected visual objects across video frames of the one or more videos and extracting corresponding tracked thumbnail images of the selected visual objects from different frames;

carry out supervised training of a classifier using the selected visual objects, the additional samples of the selected visual objects, and non-selected visual objects as negative examples, to distinguish between the selected visual objects and the presented visual objects which were not selected; and apply the classifier as a subclass filter for classifying visual objects in other videos, as belonging to the selected at least one subclass.

14. The non-transitory computer readable medium according to claim 13, further comprises determining, using the computer processor and based on the trained model, whether or not a newly obtained visual object belongs to the at least one subclass.

15. The non-transitory computer readable medium according to claim 13, wherein the at least one subclass comprises at least a first subclass and a second sub class wherein the selection and the training is carried out for the first subclass and then repeated with the second subclass.

16. The non-transitory computer readable medium according to claim 13, wherein the at least one subclass comprises at least a first subclass and a second sub class wherein the selection is carried out for the first and the second subclasses and then the training is carried out for the first and the second subclasses simultaneously.

17. The non-transitory computer readable medium according to claim 13, wherein the one or more predefined classes of the visual objects comprises a single predefined class of the visual objects.

18. The non-transitory computer readable medium according to claim 13, wherein the computer processor is further configured to automatically suggest to the human operator which class of the one or more predefined classes of the visual objects may best benefit from having subclasses.

* * * * *